(12) United States Patent
Sakuma et al.

(10) Patent No.: US 12,545,896 B2
(45) Date of Patent: Feb. 10, 2026

(54) GROWTH INHIBITOR

(71) Applicant: Orizuru Therapeutics, Inc., Fujisawa (JP)

(72) Inventors: Kensuke Sakuma, Kanagawa (JP); Noriko Yamazoe, Kanagawa (JP); Taro Toyoda, Kyoto (JP); Shuhei Konagaya, Kyoto (JP)

(73) Assignee: Orizuru Therapeutics, Inc., Kanagawa (JP)

( * ) Notice: Subject to any disclaimer, the term of this patent is extended or adjusted under 35 U.S.C. 154(b) by 896 days.

(21) Appl. No.: 17/769,456

(22) PCT Filed: Oct. 20, 2020

(86) PCT No.: PCT/JP2020/039380
§ 371 (c)(1),
(2) Date: Apr. 15, 2022

(87) PCT Pub. No.: WO2021/079874
PCT Pub. Date: Apr. 29, 2021

(65) Prior Publication Data
US 2024/0124846 A1    Apr. 18, 2024

(30) Foreign Application Priority Data
Oct. 21, 2019   (JP) .................. 2019-191876

(51) Int. Cl.
*A61K 35/39* (2015.01)
*C07K 14/47* (2006.01)
*C12N 5/071* (2010.01)

(52) U.S. Cl.
CPC ............ *C12N 5/0678* (2013.01); *A61K 35/39* (2013.01); *C07K 14/4703* (2013.01); *C12N 2506/45* (2013.01)

(58) Field of Classification Search
CPC .................................................. A61K 35/39
See application file for complete search history.

(56) References Cited

U.S. PATENT DOCUMENTS

| | | |
|---|---|---|
| 2013/0330823 A1 | 12/2013 | Rezania |
| 2017/0233700 A1 | 8/2017 | Kunisada |
| 2018/0216076 A1 | 8/2018 | Hebrok et al. |
| 2019/0127703 A1 | 5/2019 | Ameri et al. |

FOREIGN PATENT DOCUMENTS

| | | |
|---|---|---|
| CA | 3070596 A1 | 1/2019 |
| CN | 104334719 A | 2/2015 |
| CN | 106795487 A | 5/2017 |
| WO | WO-2013/095953 A1 | 6/2013 |
| WO | WO-2019/018818 A1 | 1/2019 |

OTHER PUBLICATIONS

Shirakawa et al. (2017, Cell Metab., vol. 25(4), pp. 868-882). (Year: 2017).*
El-Badawy et al., "The cell cycle as a brake for beta-cell regeneration from embryonic stem cells," Stem Cell Research & Therapy, Jan. 13, 2016, 7:9, 1-9.
Hiyoshi et al., "Characterization and reduction of non-endocrine cells accompanying islet-like endocrine cells differentiated from human iPSC," Scientific Reports, Mar. 18, 2022, 12(1):1-13.
Liew, Chee-Gee, "Generation of Insulin-Producing Cells From Pluripotent Stem Cells: From the Selection of Cell Sources to the Optimization of Protocols," The Review of Diabetic Studies, 2010, 7(2):82-92.
Supplementary European Search Report dated Oct. 10, 2023 in EP 20880103.5.
Office Action and Search Report dated Feb. 7, 2024 in CN 202080073014.x, with English translation.
International Search Report dated Dec. 15, 2020 in PCT/JP2020/039380.
Shirakawa et al., "Insulin Signaling Regulates the FoxM1/OLK1/CENP-A Pathway to Promote Adaptive Pancreatic Beta Cell Proliferation," Cell Metab., Apr. 4, 2017, 25(4):868-882.
Toyoda et al., "Cell aggregation optimizes the differentiation of human ESCs and iPSCs into pancreatic bud-like progenitor cells," Stem Cell Research, Jan. 28, 2015, 14(2):185-197.

* cited by examiner

*Primary Examiner* — Anoop K Singh
*Assistant Examiner* — David A Montanari
(74) *Attorney, Agent, or Firm* — Foley & Lardner LLP

(57) ABSTRACT

An object of the present invention is to provide an approach of removing non-endocrine unintended cells coexisting with insulin-secreting cells obtained by the differentiation. The present invention relates to a method for producing an insulin-producing cell population, comprising the step of treating an insulin-producing cell population obtained by the differentiation from pluripotent stem cells with a PLK inhibitor.

9 Claims, No Drawings

GROWTH INHIBITOR

CROSS-REFERENCE TO RELATED APPLICATIONS

This application is the U.S. National Stage of PCT/JP2020/039380, filed Oct. 20, 2020, which claims priority to JP 2019-191876, filed Oct. 21, 2019.

TECHNICAL FIELD

The present invention relates to a method for removing non-endocrine unintended cells present in an insulin-producing cell population or a pancreatic β cell population obtained by the differentiation from pluripotent stem cells.

BACKGROUND ART

Research is underway to induce the differentiation of pluripotent stem cells such as iPS cells or ES cells into insulin-secreting cells such as insulin-producing cells or pancreatic β cells and to apply the obtained cells to the treatment of diabetes mellitus.

Various approaches have been developed and reported so far in order to induce the differentiation of pluripotent stem cells into insulin-secreting cells (Non Patent Literature 1). However, an insulin-secreting cell population obtained by the differentiation comprises the insulin-secreting cells of interest as well as non-endocrine cells. There has been a strong demand for an approach to obtain the insulin-secreting cells of interest more efficiently for the treatment of diabetes mellitus.

CITATION LIST

Non Patent Literature

Non Patent Literature 1: Stem Cell Research (2015) 14, 185-197

SUMMARY OF INVENTION

Technical Problem

The present inventors have found that a cell population differentiated from pluripotent stem cells into insulin-producing cells or pancreatic β cells includes non-endocrine cells characterized by being chromogranin A (hereinafter, referred to as "CHGA")-negative (hereinafter, referred to as "CHGA-negative cells"), aside from these insulin-secreting cells (insulin-producing cells and pancreatic β cells). The present inventors have also found that the CHGA-negative cells include highly proliferative cells characterized by being Ki67 marker-positive (CHGA-negative and Ki67-positive cells).

In the case of applying insulin-secreting cells obtained by the differentiation to the treatment of diabetes mellitus, etc., it is very important from the viewpoint of safety to strictly control cell components other than the insulin-secreting cells. Furthermore, remaining highly proliferative cells might cause adverse effect on recipients or aggravate the long-term graft survival of transplanted insulin-secreting cells and are thus not preferred.

Accordingly, an object of the present invention is to provide an approach of removing CHGA-negative cells coexisting with insulin-secreting cells obtained by the differentiation.

Solution to Problem

The present inventors have conducted diligent studies to attain the object and consequently found that a pancreatic progenitor cell population, preferably an endocrine progenitor cell population, more preferably an insulin-producing cell population, or a cell population at a later stage of differentiation, obtained by the differentiation from pluripotent stem cells is treated with a PLK inhibitor, whereby the proliferation of CHGA-negative cells can be inhibited so that a pancreatic progenitor cell population, an endocrine progenitor cell population, or an insulin-producing cell population or cell population at a later stage of differentiation having a reduced proportion of these cells can be obtained.

The present invention is based on these novel findings and encompasses the following inventions.

[1] A method for producing an insulin-producing cell population, comprising the step of treating an insulin-producing cell population obtained by the differentiation from pluripotent stem cells with a PLK inhibitor.

[1-1] A method for producing an insulin-producing cell population, comprising the step of treating an endocrine progenitor cell population obtained by the differentiation from pluripotent stem cells with a PLK inhibitor.

[1-2] A method for producing an insulin-producing cell population, comprising the step of treating a pancreatic progenitor cell population obtained by the differentiation from pluripotent stem cells with a PLK inhibitor.

[2] The production method according to any of [1] to [1-2], wherein the produced cell population comprises CHGA-negative cells at a proportion of 20% or less.

[3] The production method according to any of [1] to [2], wherein the produced cell population comprises CHGA-negative and Ki67-positive cells at a proportion of 3% or less.

[4] The production method according to any of [1] to [3], wherein the produced cell population comprises insulin-positive and NKX6.1-positive cells at a proportion of 15% or more.

[5] The production method according to any of [1] to [4], further comprising the step of differentiating the cell population treated with the PLK inhibitor.

[6] The production method according to any of [1] to [5], wherein the cell population is treated with 3 μM or less of the PLK inhibitor.

[7] A method for inhibiting the proliferation of CHGA-negative cells present in an insulin-producing cell population obtained by the differentiation from pluripotent stem cells, which comprises
treating the cell population with a PLK inhibitor.

[7-1] A method for inhibiting the proliferation of CHGA-negative cells present in an endocrine progenitor cell population obtained by the differentiation from pluripotent stem cells, which comprises
treating the cell population with a PLK inhibitor.

[7-2] A method for inhibiting the proliferation of CHGA-negative cells present in a pancreatic progenitor cell population obtained by the differentiation from pluripotent stem cells, which comprises
treating the cell population with a PLK inhibitor.

[8] The method according to [7], wherein the insulin-producing cell population is treated with 3 μM or less of the PLK inhibitor.

[9] The method according to [7] or [8], wherein the proportion of the CHGA-negative cells present in the insulin-producing cell population is decreased to 20% or less.

[10] The method according to any of [7] to [9], wherein the proportion of CHGA-negative and Ki67-positive cells present in the cell population obtained by the differentiation from pluripotent stem cells is decreased to 3% or less.

[11] The method according to any of [7] to [10], wherein the proportion of insulin-positive and NKX6.1-positive cells present in the cell population obtained by the differentiation from pluripotent stem cells is increased to 15% or more.

[12] An insulin-producing cell population or a cell population at a later stage of differentiation obtained by the differentiation from pluripotent stem cells, the cell population having been treated with a PLK inhibitor and comprising CHGA-negative cells at a proportion of 20% or less.

[13] The cell population according to [12], wherein the cell population comprises CHGA-negative and Ki67-positive cells at a proportion of 3% or less.

[14] The cell population according to [12] or [13], wherein the cell population comprises insulin-positive and NKX6.1-positive cells at a proportion of 15% or more.

[15] The cell population according to any of [12] to [14], wherein the cell population is used for transplantation.

[16] A medicament for treating diabetes mellitus, comprising a cell population according to any of [12] to [15].

[17] A method for treating or preventing diabetes mellitus, comprising the step of transplanting an insulin-producing cell population or a cell population at a later stage of differentiation obtained by the differentiation from pluripotent stem cells, the cell population having been treated with a PLK inhibitor.

[18] The production method according to any of [1] to [6], wherein the PLK inhibitor is a PLK1 inhibitor or a PLK4 inhibitor.

[19] The production method according to any of [1] to [6], wherein the PLK4 inhibitor is a substance having a 50% inhibitory concentration ($IC_{50}$) of less than 5 nM against PLK4.

[20] The production method according to any of [1] to [6], wherein the PLK4 inhibitor is (1S,2R)-2-[3-[(1E)-2-[4-[[(2R,6S)-2,6-dimethyl-4-morpholinyl]methyl]phenyl]ethenyl]-1H-indazol-6-yl]-5'-methoxy-spiro[cyclopropane-1,3'-[$^3$H]indol]-2' (1'H)-one (CAS No. 1338800-06-8) or a salt thereof.

[21] The production method according to any of [1] to [6], wherein the PLK1 inhibitor is a substance having a 50% inhibitory concentration ($IC_{50}$) of less than 5 nM against PLK1.

[22] The production method according to any of [1] to [6], wherein the PLK1 inhibitor is (R)-5-(6-((4-methylpiperazin-1-yl)methyl)-1H-benz[d]imidazol-1-yl)-3-(1-(2-(trifluoromethyl)phenyl)ethoxy)thiophene-2-carboxamide (CAS No. 929095-18-1) or a salt thereof.

[23] The method according to any of [7] to [11], wherein the PLK inhibitor is a PLK1 inhibitor or a PLK4 inhibitor.

[24] The method according to any of [7] to [11], wherein the PLK4 inhibitor is a substance having a 50% inhibitory concentration ($IC_{50}$) of less than 5 nM against PLK4.

[25] The method according to any of [7] to [11], wherein the PLK4 inhibitor is (1S,2R)-2-[3-[(1E)-2-[4-[[(2R,6S)-2,6-dimethyl-4-morpholinyl]methyl]phenyl]ethenyl]-1H-indazol-6-yl]-5'-methoxy-spiro[cyclopropane-1,3'-[$^3$H]indol]-2'(1$^1$H)-one (CAS No. 1338800-06-8) or a salt thereof.

[26] The method according to any of [7] to [11], wherein the PLK1 inhibitor is a substance having a 50% inhibitory concentration ($IC_{50}$) of less than 5 nM against PLK1.

[27] The method according to any of [7] to [11], wherein the PLK1 inhibitor is (R)-5-(6-((4-methylpiperazin-1-yl)methyl)-1H-benz[d]imidazol-1-yl)-3-(1-(2-(trifluoromethyl)phenyl)ethoxy)thiophene-2-carboxamide (CAS No. 929095-18-1) or a salt thereof.

[28] The cell population according to any of [12] to [15], wherein the PLK inhibitor is a PLK1 inhibitor or a PLK4 inhibitor.

[29] A medicament for treating diabetes mellitus, comprising a cell population according to [28].

[30] The method according to [17], wherein the PLK inhibitor is a PLK1 inhibitor or a PLK4 inhibitor.

[31] The method according to [5], wherein the step of differentiating the insulin-producing cell population treated with the PLK inhibitor is performed by transplantation to an animal.

[32] The method according to any of [7] to [11], wherein the absolute number of the CHGA-negative cells present in the cell population is decreased.

[33] The method according to any of [7] to [11], wherein the number of cells other than the CHGA-negative cells present in the cell population is not decreased.

[34] The cell population according to any of [12] to [14], wherein the cell population comprises CHGA-negative and Ki67-positive cells at a proportion of 2% or less.

[35] The cell population according to any of [12] to [14], wherein the cell population comprises CHGA-negative and Ki67-positive cells at a proportion of 1% or less.

[36] A prodrug comprising a cell population according to any of [12] to [14], [34] and [35].

[37] A method for producing an insulin-producing cell population or a pancreatic β cell population, comprising the steps of:
(1) treating an insulin-producing cell population or a pancreatic β cell population with a PLK inhibitor; and
(2) embedding the insulin-producing cell population into a gel containing a biocompatible material.

[38] A method for producing an insulin-producing cell population or a pancreatic β cell population, comprising the steps of:
(0) increasing the purity of a target cell population to at least 70% or more by a method for purifying the target cell population;
(1) treating an insulin-producing cell population or a pancreatic β cell population with an PLK inhibitor; and
(2) differentiating the insulin-producing cell population treated with the PLK inhibitor.

[39] The method according to [30], wherein the PLK4 inhibitor is a substance having a 50% inhibitory concentration ($IC_{50}$) of less than 5 nM against PLK4.

[40] The method according to [30], wherein the PLK4 inhibitor is (1S,2R)-2-[3-[(1E)-2-[4-[[(2R,6S)-2,6-dimethyl-4-morpholinyl]methyl]phenyl]ethenyl]-1H-indazol-6-yl]-5'-methoxy-spiro[cyclopropane-1,3'-[$^3$H]indol]-2'(1'H)-one (CAS No. 1338800-06-8) or a salt thereof.

[41] The method according to [30], wherein the PLK1 inhibitor is a substance having a 50% inhibitory concentration ($IC_{50}$) of less than 5 nM against PLK1.

[42] The method according to [30], wherein the PLK1 inhibitor is (R)-5-(6-((4-methylpiperazin-1-yl)methyl)-1H-benz[d]imidazol-1-yl)-3-(1-(2-(trifluoromethyl)phenyl)ethoxy)thiophene-2-carboxamide (CAS No. 929095-18-1) or a salt thereof.

[43] The method according to any of [17], [30] and [39] to [42], wherein the cell population comprises CHGA-negative cells at a proportion of 20% or less.

[44] The method according to any of [17], [30] and [39] to [42], wherein the cell population comprises CHGA-negative and Ki67-positive cells at a proportion of 3% or less.

[45] The method according to any of [17], [30] and [39] to [42], wherein the cell population comprises insulin-positive and NKX6.1-positive cells at a proportion of 15% or more.

[46] An insulin-producing cell population or a cell population at a later stage of differentiation obtained by the differentiation from pluripotent stem cells for use in a method for treating or preventing diabetes mellitus, the cell population having been treated with a PLK inhibitor.

[47] The cell population according to [46], wherein the PLK inhibitor is a PLK1 inhibitor or a PLK4 inhibitor.

[48] The cell population according to [47], wherein the PLK4 inhibitor is a substance having a 50% inhibitory concentration ($IC_{50}$) of less than 5 nM against PLK4.

[49] The cell population according to [47], wherein the PLK4 inhibitor is (1S,2R)-2-[3-[(1E)-2-[4-[[(2R,6S)-2,6-dimethyl-4-morpholinyl]methyl]phenyl]ethenyl]-1H-indazol-6-yl]-5'-methoxy-spiro[cyclopropane-1,3'-[$^3$H]indol]-2'(1'H)-one (CAS No. 1338800-06-8) or a salt thereof.

[50] The cell population according to [47], wherein the PLK1 inhibitor is a substance having a 50% inhibitory concentration ($IC_{50}$) of less than 5 nM against PLK1.

[51] The cell population according to [47], wherein the PLK1 inhibitor is (R)-5-(6-((4-methylpiperazin-1-yl)methyl)-1H-benz[d]imidazol-1-yl)-3-(1-(2-(trifluoromethyl)phenyl)ethoxy)thiophene-2-carboxamide (CAS No. 929095-18-1) or a salt thereof.

[52] The cell population according to any of [46] to [51], wherein the cell population comprises CHGA-negative cells at a proportion of 20% or less.

[53] The cell population according to any of [46] to [51], wherein the cell population comprises CHGA-negative and Ki67-positive cells at a proportion of 3% or less.

[54] The cell population according to any of [46] to [51], wherein the cell population comprises CHGA-negative and Ki67-positive cells at a proportion of 2% or less.

[55] The cell population according to any of [46] to [51], wherein the cell population comprises CHGA-negative and Ki67-positive cells at a proportion of 1% or less.

[56] The cell population according to any of [46] to [51], wherein the cell population comprises insulin-positive and NKX6.1-positive cells at a proportion of 15% or more.

[57] Use of an insulin-producing cell population or a cell population at a later stage of differentiation obtained by the differentiation from pluripotent stem cells in the production of a medicament for treating or preventing diabetes mellitus, the cell population having been treated with a PLK inhibitor.

[58] The use according to [57], wherein the PLK inhibitor is a PLK1 inhibitor or a PLK4 inhibitor.

[59] The use according to [58], wherein the PLK4 inhibitor is a substance having a 50% inhibitory concentration ($IC_{50}$) of less than 5 nM against PLK4.

[60] The use according to [58], wherein the PLK4 inhibitor is (1S,2R)-2-[3-[(1E)-2-[4-[[(2R,6S)-2,6-dimethyl-4-morpholinyl]methyl]phenyl]ethenyl]-1H-indazol-6-yl]-5'-methoxy-spiro[cyclopropane-1,3'-[$^3$H]indol]-2'(1'H)-one (CAS No. 1338800-06-8) or a salt thereof.

[61] The use according to [58], wherein the PLK1 inhibitor is a substance having a 50% inhibitory concentration ($IC_{50}$) of less than 5 nM against PLK1.

[62] The use according to [58], wherein the PLK1 inhibitor is (R)-5-(6-((4-methylpiperazin-1-yl)methyl)-1H-benz[d]imidazol-1-yl)-3-(1-(2-(trifluoromethyl)phenyl)ethoxy)thiophene-2-carboxamide (CAS No. 929095-18-1) or a salt thereof.

[63] The use according to any of [57] to [62], wherein the cell population comprises CHGA-negative cells at a proportion of 20% or less.

[64] The use according to any of [57] to [62], wherein the cell population comprises CHGA-negative and Ki67-positive cells at a proportion of 3% or less.

[65] The use according to any of [57] to [62], wherein the cell population comprises CHGA-negative and Ki67-positive cells at a proportion of 2% or less.

[66] The use according to any of [57] to [62], wherein the cell population comprises CHGA-negative and Ki67-positive cells at a proportion of 1% or less.

[67] The use according to any of [57] to [62], wherein the cell population comprises insulin-positive and NKX6.1-positive cells at a proportion of 15% or more.

The present specification encompasses the contents described in the specification and/or drawings of Japanese Patent Application No. 2019-191876 on which the priority of the present application is based.

All publications, patents and patent applications cited herein are incorporated herein by reference in their entirety.

Advantageous Effects of Invention

The present invention can provide an approach of removing CHGA-negative cells coexisting with insulin-producing cells obtained by the differentiation.

DESCRIPTION OF EMBODIMENTS

1. Terminology

Hereinafter, the terms described herein will be described.

As used herein, "about" refers to a value which may vary up to plus or minus 25%, 20%, 10%, 8%, 6%, 5%, 4%, 3%, 2%, or 1% from the reference value. Preferably, the term "about" or "around" refers to a range from minus or plus 15%, 10%, 5%, or 1% from the reference value.

As used herein, "comprise(s)" or "comprising" means inclusion of the element(s) following the word without limitation thereto. Accordingly, it indicates inclusion of the element(s) following the word, but does not indicate exclusion of any other element.

As used herein, "consist(s) of" or "consisting of" means inclusion of all the element(s) following the phrase and limitation thereto. Accordingly, the phrase "consist(s) of" or "consisting of" indicates that the enumerated element(s) is required or essential and substantially no other elements exist.

As used herein, "without the use of feeder cell(s)" means basically containing no feeder cells and using no medium preconditioned by culturing feeder cells. Accordingly, the medium does not contain any substance, such as a growth factor or a cytokine, secreted by feeder cells.

"Feeder cells" or "feeder" means cells that are co-cultured with another kind of cells, support the cells, and provide an environment that allows the cells to grow. The feeder cells may be derived from the same species as or a different species from the cells that they support. For example, as a feeder for human cells, human skin fibroblasts or human embryonic-stem cells may be used or a primary culture of murine embryonic fibroblasts or immortalized murine embryonic fibroblasts may be used. The feeder cells can be inactivated by exposure to radiation or treatment with mitomycin C.

As used herein, "adhered (adherent)" refers to cells are attached to a container, for example, cells are attached to a cell culture dish or a flask made of a sterilized plastic (or coated plastic) in the presence of an appropriate medium. Some cells cannot be maintained or grow in culture without adhering to the cell culture container. In contrast, non-adherent cells can be maintained and proliferate in culture without adhering to the container.

As used herein, "culture" refers to maintaining, growing, and/or differentiating cells in in vitro environment. "Culturing" means maintaining, proliferating, and/or differentiating cells out of tissue or the living body, for example, in a cell culture dish or flask. The culture includes two-dimensional culture (plane culture) and three-dimensional culture (suspension culture).

As used herein, "enrich(es)" and "enrichment" refer to increasing the amount of a certain component in a composition such as a composition of cells and "enriched" refers, when used to describe a composition of cells, for example, a cell population, to a cell population increased in the amount of a certain component in comparison with the percentage of such component in the cell population before the enrichment. For example, a composition such as a cell population can be enriched for a target cell type and, accordingly, the percentage of the target cell type is increased in comparison with the percentage of the target cells present in the cell population before the enrichment. A cell population can be enriched for a target cell type by a method of selecting and sorting cells known in the art. A cell population can be enriched by a specific process of sorting or selection described herein. In a certain embodiment of the present invention, a cell population is enriched for a target cell population at least 20%, 30%, 40%, 50%, 60%, 70%, 80%, 85%, 90%, 95%, 97%, 98%, or 99% by a method of enriching the target cell population.

As used herein, "deplete(s)" and "depletion" refer to decreasing the amount of a certain component in a composition such as a composition of cells and "depleted" refers, when used to describe a composition of cells, for example, a cell population, to a cell population decreased in the amount of a certain component in comparison with the percentage of such component in the cell population before the depletion. For example, a composition such as a cell population can be depleted for a target cell type and, accordingly, the percentage of the target cell type is decreased in comparison with the percentage of the target cells present in the cell population before the depletion. A cell population can be depleted for a target cell type by a method of selecting and sorting cells known in the art. A cell population can be depleted by a specific process of sorting or selection described herein. In a certain embodiment of the present invention, a cell population is reduced (depleted) for a target cell population at least 50%, 80%, 85%, 90%, 95%, 97%, 98%, or 99% by a method of depleting a target cell population.

As used herein, "purify(ies)" and "purification" refer to removing impurities in a composition such as a composition of cells and making it pure for a certain component and "purified" refers, when used to describe a composition of cells, for example, a cell population, to a cell population in which the amount of impurities is decreased in comparison with the percentage of such components in the cell population before purification and the purity of a certain component is improved. For example, a composition such as a cell population can be purified for a target cell type and, accordingly, the percentage of the target cell type is increased in comparison with the percentage of the target cells present in the cell population before the purification. A cell population can be purified for a target cell type by a method of selecting and sorting cells known in the art. A cell population can be purified by a specific process of sorting or selection described herein. In a certain embodiment of the present invention, the purity of a target cell population is brought by a method of purifying a target cell population to at least 70%, 80%, 85%, 90%, 95%, 97%, 98%, or 99% or to the extent at which impurities (including contaminant cells) are undetectable.

As used herein, "not decrease the number of cells" means that the number of cells is not markedly decreased due to the execution of the method of the present invention and means that there is no marked difference between the number of cells before the execution of the method and the number of cells after the execution of the method. However, decrease in the number of cells that is not caused by the execution of the method of the present invention (e.g., natural death of cells that may usually occur in conventionally known cell culture and differentiation steps) may occur. Thus, "not decrease the number of cells" also includes the case where the rate of decrease in the number of cells after execution of the method of the present invention from that before the execution is 30% or less, 20% or less, 10% or less, or 5% or less.

As used herein, "suppressing proliferation" means that the number of cells is not markedly increased due to the execution of the method of the present invention and means that there is no marked increase between the number of cells before the execution of the method and the number of cells after the execution of the method. Thus, "suppressing proliferation" also includes the case where the rate of increase in the number of cells after execution of the method of the present invention from that before the execution is 30% or less, 20% or less, 10% or less, or 5% or less.

As used herein, "marker" means a cell antigen or a gene thereof that is specifically expressed on a predetermined cell type, such as "marker protein" and "marker gene". Preferably, a marker is a cell surface marker and this allows enrichment, isolation, and/or detection of living cells. A marker can be a positive selection marker or a negative selection marker.

The detection of a marker protein can be conducted by an immunological assay, for example, ELISA, immunostaining, or flow cytometry using an antibody specific for the marker protein. The detection of a marker gene can be conducted by a method of amplifying and/or detecting nucleic acid known in the art, for example, RT-PCR, microarray, biochip, or the like. As used herein, "positive" for a marker protein means being detected to be positive by flow cytometry and "negative" therefor means being equal to or less than the lower detection limit in flow cytometry. Also, as used herein, "positive" for a marker gene means being detected by RT-PCR and "negative" therefor means being equal to or less than the lower detection limit in RT-PCR.

As used herein, "expression" is defined as transcription and/or translation of a certain nucleotide sequence driven by an intracellular promoter.

As used herein, "factor having CDK8/19-inhibiting activity" means any substance having the inhibitory activity for CDK8/19. CDK8, in contrast to the other proteins of the same CDK family, is not required for cell proliferation. The inhibition of CDK8 has no great effect under usual conditions. CDK19 and CDK8 are similar to each other. Usually, the inhibition of CDK8 also is usually accompanied by the inhibition of CDK19.

"Growth factors" are endogenous proteins that promote differentiation and/or proliferation of particular cells. Examples of "growth factors" include epidermal growth factor (EGF), acid fibroblast growth factor (aFGF), basic fibroblast growth factor (bFGF), hepatocyte growth factor (HGF), insulin-like growth factor 1 (IGF-1), insulin-like growth factor 2 (IGF-2), keratinocyte growth factor (KGF), nerve growth factor (NGF), platelet-derived growth factor (PDGF), transformation growth factor beta (TGF-β), vascular endothelial growth factor (VEGF), transferrin, various interleukins (for example, IL-1 to IL-18), various colony stimulating factors (for example, granulocyte/macrophage-colony stimulating factor (GM-CSF)), various interferons (for example, IFN-γ, and the like), and other cytokines having effects on stem cells, for example, stem cell factor (SCF), and erythropoietin (Epo).

As used herein, "ROCK inhibitors" means substances that inhibit Rho kinase (ROCK: Rho-associated, coiled-coil containing protein kinase) and may be substances that inhibit either of ROCK I and ROCK II. The ROCK inhibitors are not particularly limited as long as they have the aforementioned function and examples include N-(4-pyridinyl)-4β-[(R)-1-aminoethyl]cyclohexane-1α-carboxamide (that may be herein also referred to as Y-27632), Fasudil (HA1077), (2S)-2-methyl-1-[(4-methyl-5-isoquinolinyl]sulfonyl]hexahydro-1H-1,4-diazepine (H-1152), 4β-[(1R)-1-aminoethyl]-N-(4-pyridyl)benzene-1α-carbamide (Wf-536), N-(1H-pyrrolo[2,3-b]pyridin-4-yl)-4PER(R)-1-aminoethyl]cyclohexane-1α-carboxamide (Y-30141), N-(3-{[2-(4-amino-1,2,5-oxadiazol-3-yl)-1-ethyl-1H-imidazo[4,5-c]pyridin-6-yl]oxy}phenyl)-4-{[2-(4-morpholinyl)ethyl]oxy}benzamide (GSK269962A), N-(6-fluoro-1H-indazol-5-yl)-6-methyl-2-oxo-4-[4-(trifluoromethyl)phenyl]-3,4-dihydro-1H-pyridine-5-carboxamide (GSK429286A). The ROCK inhibitors are not limited to these and antisense oligonucleotides and siRNA to ROCK mRNA, antibodies that bind to ROCK, and dominant negative ROCK mutants can also be used, commercially available, or synthesized according to a known method as ROCK inhibitors.

As used herein, "GSK3β inhibitors" are substances having the inhibitory activity for GSK3β (glycogen synthase kinase 3β). GSK3 (glycogen synthase kinase 3) is a serine/threonine protein kinase and involved in many signaling pathways associated with the production of glycogen, apoptosis, maintenance of stem cells, etc. GSK3 has the 2 isoforms α and β. "GSK3β inhibitors" used in the present invention are not particularly limited as long as they have the GSK3β-inhibiting activity and they may be substances having both the GSK3α-inhibiting activity and the GSK3β-inhibiting activity.

Examples of GSK3β inhibitors include CHIR98014 (2-[[2-[(5-nitro-6-aminopyridin-2-yl)amino]ethyl]amino]-4-(2,4-dichlorophenyl)-5-(1H-imidazol-1-yl)pyrimidine), CHIR99021 (6-[[2-[[4-(2,4-dichlorophenyl)-5-(4-methyl-1H-imidazol-2-yl)-2-pyrimidinyl]amino]ethyl]amino]nicotinonitrile), TDZD-8 (4-benzyl-2-methyl-1,2,4-thiadiazolidine-3,5-dione), SB216763 (3-(2,4-dichlorophenyl)-4-(1-methyl-1H-indol-3-yl)-1H-pyrrole-2,5-dione), TWS-119 (3-[6-(3-aminophenyl)-7H-pyrrolo[2,3-d]pyrimidin-4-yloxy]phenol), kenpaullone, 1-azakenpaullone, SB216763 (3-(2,4-dichlorophenyl)-4-(1-methyl-1H-indol-3-yl)-1H-pyrrole-2,5-dione), SB415286 (3-[(3-chloro-4-hydroxyphenyl)amino]-4-(2-nitrophenyl)-1H-pyrrole-2,5-dione), and AR-AO144-18, CT99021, CT20026, BIO, BIO-acetoxime, pyridocarbazole-ruthenium cyclopentadienyl complex, OTDZT, alpha-4-dibromoacetophenone, lithium, and the like. GSK3β is not limited to these and antisense oligonucleotides and siRNA to GSK3β mRNA, antibodies that bind to GSK30, dominant negative GSK3β mutants, and the like can also be used, commercially available, or synthesized according to a known method as GSK3β inhibitors.

As used herein, examples of "serum replacement" include KnockOut™ Serum Replacement (KSR: Thermo Fisher Scientific), StemSure® Serum Replacement (Wako), B-27 supplement, N2-supplement, albumin (for example, lipid rich albumin), insulin, transferrin, fatty acids, collagen precursors, trace elements (for example, zinc, selenium (for example, sodium selenite)), 2-mercaptoethanol, 3'-thiolglycerol, or mixtures thereof (for example, ITS-G). Preferred serum replacements are B-27 supplement, KSR, StemSure® Serum Replacement, ITS-G. The concentration of serum replacement in a medium when added into a medium is 0.01-10% by weight, and preferably 0.1-2% by weight. In the present invention, "serum replacement" is preferably used instead of serum.

2. Insulin-Producing Cell Population in which Proliferation of CHGA-Negative Cells has been Suppressed The present invention relates to an insulin-producing cell population in which proliferation of CHGA-negative cells has been suppressed. Such a cell population can be obtained by treatment with a PLK inhibitor.

The present invention also relates to a method for inhibiting the proliferation of CHGA-negative cells by treatment with a PLK inhibitor.

"CHGA-negative cells" means non-endocrine cells that are present in a pancreatic progenitor cell population, preferably an endocrine progenitor cell population, more preferably an insulin-producing cell population, or a cell population at a later stage of differentiation, obtained by the differentiation from pluripotent stem cells in the process of differentiation of the pluripotent stem cells into pancreatic β cells, and are characterized by being negative to the expression of a CHGA marker.

"CHGA-negative cells" can include cells characterized in that the expression of Ki67 is found as a marker (that is, CHGA-negative and Ki67-positive cells).

"Ki67" is known as a cell cycle-related nucleoprotein and is also known as a marker for cell proliferation and cell cycle because its expression is found in the G1, S, G2, and M phases of proliferating cells and is not found in the G0 phase, a quiescent stage. Hence, the CHGA-negative and Ki67-positive cells are highly proliferative cells.

"Insulin-producing cell population" according to the present invention means a cell population comprising insulin-producing cells obtained by the differentiation from pluripotent stem cells. "Insulin-producing cells" means cells characterized in that the expression of a marker of insulin is found (that is, insulin-positive cells). "Insulin-producing cells" are cells that may express a marker of NK6 homeobox 1 (NKX6.1) and preferably express both markers of insulin and NKX6.1 (that is, insulin-positive and NKX6.1-positive cells).

"Insulin-producing cell population" according to the present invention has a low content of CHGA-negative cells as compared with an insulin-producing cell population obtained by the differentiation from pluripotent stem cells according to a conventionally known approach. The content percentage (that may be herein also referred to as "proportion") thereof is 40% or less or 30% or less, preferably 20% or less, more preferably 15% or less, further preferably 10% or less, for example, 9% or less, 8% or less, 7% or less, 6% or less, 5% or less, 4% or less, 3% or less, 2% or less, or 1% or less. The lower limit of the content percentage is not particularly limited and is 0% or more, 0.1% or more, or 0.5% or more. The content percentage can be expressed using two numeric values respectively selected from the numeric values of the upper limit and the lower limit. The content percentage is, for example, 0.5% to 40% or 0.5% to 30%, preferably 0.5% to 20%, more preferably 0.5% to 15%, further preferably 0.5% to 10%. On the other hand, "insulin-producing cell population" according to the present invention is a cell population enriched in insulin-positive cells, particularly, insulin-positive and NKX6.1-positive cells, as compared with an insulin-producing cell population obtained by the differentiation from pluripotent stem cells according to a conventionally known approach. The content percentage of the insulin-positive and NKX6.1-positive cells is 14% or more, preferably 15% or more, more preferably 20% or more, further preferably 25% or more, for example, 30% or more, 35% or more, 40% or more, or 45% or more. The upper limit of the content percentage is not particularly limited and is 70% or less, 60% or less, or 50% or less. The content percentage can be expressed using two numeric values respectively selected from the numeric values of the upper limit and the lower limit. The content percentage is, for example, 14% to 50%, preferably 15% to 50%, more preferably 20% to 50%, further preferably 25% to 50%.

"Insulin-producing cell population" according to the present invention can be obtained by treating a pancreatic progenitor cell population, preferably an endocrine progenitor cell population, more preferably an insulin-producing cell population, or a cell population at a later stage of differentiation, obtained by the differentiation from pluripotent stem cells with a PLK inhibitor. The treatment of a cell population at a predetermined stage of differentiation with a PLK inhibitor can inhibit the proliferation of CHGA-negative cells, decrease the content of the cells, and enrich insulin-positive cells, preferably insulin-positive and NKX6.1-positive cells.

It is known that cells having different features depending on the stages of differentiation appear in the process of differentiation of pluripotent stem cells into pancreatic β cells (WO2009/012428 and WO2016/021734). For example, the stages of differentiation can be broadly classified into pluripotent stem cells, definitive endoderm cells, primitive gut tube cells, posterior foregut cells, pancreatic progenitor cells, endocrine progenitor cells, insulin-producing cells, and pancreatic β cells in order from relatively undifferentiated to differentiated forms.

As used herein, "pluripotency" means the ability to differentiate into tissues and cells having different morphologies and functions and to differentiate into cells of any lineage of the 3 germ layers. "Pluripotency" is different from "totipotency", which is the ability to differentiate into any tissue of the living body, including the placenta, in that pluripotent cells cannot differentiate into the placenta and therefore, do not have the ability to form an individual.

As used herein, "multipotency" means the ability to differentiate into plural and limited numbers of linages of cells. For example, mesenchymal stem cells, hematopoietic stem cells, neural stem cells are multipotent, but not pluripotent.

As used herein, "pluripotent stem cells" refers to embryonic-stem cells (ES cells) and cells potentially having a pluripotency similar to that of ES cells, that is, the ability to differentiate into various tissues (all of the endodermal, mesodermal, and ectodermal tissues) in the living body. Examples of cells having a pluripotency similar to that of ES cells include "induced pluripotent stem cells" (that may be herein also referred to as "iPS cells"). In the present invention, preferably, pluripotent stem cells are human pluripotent stem cells.

Available "ES cells" include murine ES cells, such as various murine ES cell lines established by inGenious, Institute of Physical and Chemical Research (RIKEN), and the like, and human ES cells, such as various human ES cell lines established by National Institutes of Health (NIH), RIKEN, Kyoto University, Cellartis, and the like. For example, available ES cell lines include CHB-1 to CHB-12, RUES1, RUES2, HUES1 to HUES28 from NIH, and the like; Hi and H9 from WiCell Research Institute; and KhES-1, KhES-2, KhES-3, KhES-4, KhES-5, SSES1, SSES2, SSES3 from RIKEN, and the like.

"Induced pluripotent stem cells" refers to cells that are obtained by reprograming mammalian somatic cells or undifferentiated stem cells by introducing specific sets of factors (nuclear reprogramming factors). At present, there are various "induced pluripotent stem cells" and iPS cells established by Yamanaka, et al. by introducing the 4 factors Oct3/4, Sox2, Klf4, and c-Myc into murine fibroblasts (Takahashi K, Yamanaka S., Cell, (2006) 126: 663-676); iPS cells derived from human cells, established by introducing similar 4 factors into human fibroblasts (Takahashi K, Yamanaka S., et al. Cell, (2007) 131: 861-872.); Nanog-iPS cells established by sorting cells using expression of Nanog as an indicator after introduction of the 4 factors (Okita, K., Ichisaka, T., and Yamanaka, S. (2007). Nature 448, 313-317.); iPS cells produced by a method not using c-Myc (Nakagawa M, Yamanaka S., et al. Nature Biotechnology, (2008) 26, 101-106); and iPS cells established by introducing 6 factors in a virus-free way (Okita K et al. Nat. Methods 2011 May; 8(5): 409-12, Okita K et al. Stem Cells. 31 (3) 458-66) may be also used. Also, induced pluripotent stem cells established by introducing the 4 factors OCT3/4, SOX2, NANOG, and LIN28 by Thomson et al. (Yu J., Thomson J A. et al., Science (2007) 318: 1917-1920.); induced pluripotent stem cells produced by Daley et al. (Park I H, Daley G Q. et al., Nature (2007) 451: 141-146); induced pluripotent stem cells produced by Sakurada et al. (Japanese Unexamined Patent Application Publication No. 2008-307007) and the like may be used.

In addition, any of known induced pluripotent stem cells known in the art described in all published articles (for example, Shi Y., Ding S., et al., Cell Stem Cell, (2008) Vol 3, Issue 5, 568-574; Kim J B., Scholer H R., et al., Nature, (2008) 454, 646-650; Huangfu D., Melton, D A., et al., Nature Biotechnology, (2008) 26, No. 7, 795-797) or patents (for example, Japanese Unexamined Patent Application Publication No. 2008-307007, Japanese Unexamined Patent Application Publication No. 2008-283972, US2008-2336610, US2009-047263, WO2007-069666, WO2008-118220, WO2008-124133, WO2008-151058, WO2009-006930, WO2009-006997, WO2009-007852) may be used.

Available induced pluripotent cell lines include various iPS cell lines established by NIH, Institute of Physical and Chemical Research (RIKEN), Kyoto University and the like. For example, such human iPS cell lines include the RIKEN cell lines HiPS-RIKEN-1A, HiPS-RIKEN-2A, HiPS-RIKEN-12A, and Nips-B2 and the Kyoto University cell lines Ff-WJ-18, Ff-I01s01, Ff-I01s02, Ff-I01s04, Ff-I01s06, Ff-I14s03, Ff-I14s04, QHJI01s01, QHJI01s04, QHJI14s03, QHJI14s04, 253G1, 201B7, 409B2, 454E2, 606A1, 610B1, 648A1, CDI cell lines MyCell iPS Cells (21525.102.10A), MyCell iPS Cells (21526.101.10A), and the like.

As used herein, "pancreatic progenitor cell population" means a cell population comprising pancreatic progenitor cells. As used herein, pancreatic progenitor cells mean cells characterized by the expression of at least one of the markers PDX-1, NKX6.1, PTF-1α, GATA4 and SOX9.

The pancreatic progenitor cell population is a cell population comprising pancreatic progenitor cells at a proportion of 30% or more, preferably 40% or more, more preferably 50% or more, further preferably 60% or more, still further preferably 70% or more. The pancreatic progenitor cell population may include other cells (for example, endocrine progenitor cells, insulin-producing cells, Ki67-positive cells, and CHGA-negative cells), in addition to the pancreatic progenitor cells.

As used herein, "endocrine progenitor cell population" means a cell population comprising endocrine progenitor cells.

As used herein, endocrine progenitor cells mean cells characterized by the expression of at least one of the markers CHGA, NeuroD and NGN3 and no expression of a marker of the pancreas-related hormone system (for example, insulin). The endocrine progenitor cells may express a marker such as PAX-4, NKX2.2, Islet-1, PDX-1, or PTF-1α.

The endocrine progenitor cell population is a cell population comprising endocrine progenitor cells at a proportion of 30% or more, preferably 40% or more, more preferably 50% or more, further preferably 60% or more, still further preferably 70% or more. The endocrine progenitor cell population may include other cells (for example, pancreatic progenitor cells, insulin-producing cells, Ki67-positive cells, and CHGA-negative cells), in addition to the endocrine progenitor cells.

The proportion of specific cells in a cell population can be determined by a known approach capable of calculating the number of cells, such as flow cytometry.

"Insulin-producing cells" are as mentioned above. "Insulin-producing cell population" comprises insulin-producing cells at a proportion of usually 5% or more, preferably 10% or more, more preferably 15% or more, further preferably 20% or more, still further preferably 25% or more, particularly preferably 30% or more. The cell population may include other cells (for example, endocrine progenitor cells; other pancreatic hormone-producing cells expressing at least one of the markers glucagon, somatostatin, and pancreatic polypeptide; Ki67-positive cells and CHGA-negative cells), in addition to the insulin-producing cells.

As used herein, "pancreatic β cells" means cells more mature than "insulin-producing cells" and specifically means cells characterized by expressing at least one of the markers MAFA, UCN3, and IAPP, which are maturation markers of pancreatic β cells, or by an increase in insulin secretion by glucose stimulation.

"Pancreatic β cell population" is a cell population comprising pancreatic β cells that can be obtained by the differentiation and/or maturation, preferably the in vivo differentiation and/or maturation, of an insulin-producing cell population. The cell population may include other cells (for example, insulin-producing cells, Ki67-positive cells and CHGA-negative cells), in addition to the pancreatic β cells.

The cell population at each stage of differentiation can be obtained by use of a known approach of inducing the differentiation of pluripotent stem cells into pancreatic β cells. Specifically, each cell population of interest can be obtained using the following steps of induction of differentiation:

step 1) inducing the differentiation of pluripotent stem cells into definitive endoderm cells;
step 2) inducing the differentiation of the definitive endoderm cells into primitive gut tube cells;
step 3) inducing the differentiation of the primitive gut tube cells into posterior foregut cells;
step 4) inducing the differentiation of the posterior foregut cells into pancreatic progenitor cells;
step 5) inducing the differentiation of the pancreatic progenitor cells into endocrine progenitor cells; and
step 6) inducing the differentiation of the endocrine progenitor cells into insulin-producing cells.

Hereinafter, each step will be described, though the differentiation into each cell is not limited by these approaches.

Step 1) Differentiation into Definitive Endoderm Cells

The pluripotent stem cells are first allowed to differentiate into definitive endoderm cells. Methods for inducing the definitive endoderm from pluripotent stem cells have already been known, and any of the methods may be used. Preferably, the pluripotent stem cells are cultured in a medium containing activin A, more preferably a medium containing activin A, a ROCK inhibitor, and a GSK3β inhibitor, to thereby differentiate into definitive endoderm cells. The number of cells at the start of culture is not particularly limited and is 22000 to 150000 cells/cm$^2$, preferably 22000 to 100000 cells/cm$^2$, more preferably 22000 to 80000 cells/cm$^2$. The culture period is 1 day to 4 days, preferably 1 day to 3 days, particularly preferably 3 days.

The culture temperature is not particularly limited, and the culture is performed at 30 to 40° C. (for example, 37° C.). The concentration of carbon dioxide in a culture container is around, for example, 5%. The culture may be performed by any of two-dimensional culture and three-dimensional culture.

The medium used in this step may be a basal medium for use in the culture of mammalian cells, such as RPMI 1640 medium, MEM medium, iMEM medium, DMEM/F12 medium, Improved MEM Zinc Option medium, Improved MEM/1% B-27/Penicillin Streptomycin medium, or MCDB131/20 mM Glucose/NaHCO$_3$/FAF-BSA/ITS-X/GlutaMAX™/ascorbic acid/Penicillin Streptomycin medium.

The concentration of the activin A in the medium is usually 30 to 200 ng/mL, preferably 50 to 150 ng/mL, more preferably 70 to 120 ng/mL, particularly preferably about 100 ng/mL.

In another embodiment, the activin A can be contained at a low dose, for example, in an amount of 5 to 100 ng/mL, preferably 5 to 50 ng/mL, more preferably 5 to 10 ng/mL, in the medium.

In a further alternative embodiment, the concentration of the activin A in the medium is about 0.1 to 100 ng/mL, preferably about 1 to 50 ng/mL, more preferably about 3 to 10 ng/mL.

The concentration of the GSK3β inhibitor in the medium is appropriately set depending on the type of the GSK3β inhibitor used. For example, in the case of using CHIR99021 as the GSK3β inhibitor, its concentration is usually 2 to 5 μM, preferably 2 to 4 μM, particularly preferably about 3 μM.

The concentration of the ROCK inhibitor in the medium is appropriately set depending on the type of the ROCK inhibitor used. For example, in the case of using Y27632 as the ROCK inhibitor, its concentration is usually 5 to 20 μM, preferably 5 to 15 μM, particularly preferably about 10 μM.

The medium can be further supplemented with insulin. The insulin can be contained in an amount of 0.01 to 20 μM, preferably 0.1 to 10 μM, more preferably 0.5 to 5 μM, in the medium. The concentration of the insulin in the medium may be, but is not limited to, the concentration of insulin included in added B-27 supplement.

In a particular embodiment, the cells are cultured for 1 day in a medium containing activin A, a ROCK inhibitor, and a GSK3β inhibitor and then further cultured for 2 days in a medium containing only activin A with the medium replaced with a fresh one every day. Alternatively, the pluripotent stem cells can be subjected to first culture in a medium containing 0.01 to M insulin in the presence of a low dose of activin A and subsequently subjected to second culture in an insulin-free medium, for production.

Step 2) Differentiation into Primitive Gut Tube Cells

The definitive endoderm cells obtained in step 1) are further cultured in a medium containing a growth factor to differentiate into primitive gut tube cells. The culture period is 2 days to 8 days, preferably about 4 days.

The culture temperature is not particularly limited, and the culture is performed at 30 to 40° C. (for example, 37° C.). The concentration of carbon dioxide in a culture container is around, for example, 5%. The culture may be performed by any of two-dimensional culture and three-dimensional culture.

A basal medium for use in the culture of mammalian cells can be used as culture medium, as in step 1). The medium may be appropriately supplemented with a serum replacement, a vitamin, an antibiotic, and the like, in addition to the growth factor.

The growth factor is preferably EGF, KGF, and/or FGF10, more preferably EGF and/or KGF, further preferably KGF.

The concentration of the growth factor in the medium is appropriately set depending on the type of the growth factor used and is usually about 0.1 nM to 1000 μM, preferably about 0.1 nM to 100 μM. In the case of EGF, its concentration is about 5 to 2000 ng/ml (that is, about 0.8 to 320 nM), preferably about 5 to 1000 ng/ml (that is, about 0.8 to 160 nM), more preferably about 10 to 1000 ng/ml (that is, about 1.6 to 160 nM). In the case of FGF10, its concentration is about 5 to 2000 ng/ml (that is, about 0.3 to 116 nM), preferably about 10 to 1000 ng/ml (that is, about 0.6 to 58 nM). For example, in the case of using KGF as the growth factor, its concentration is usually 5 to 150 ng/mL, preferably 30 to 100 ng/mL, particularly preferably about 50 ng/mL.

Step 3) Differentiation into Posterior Foregut Cells

The primitive gut tube cells obtained in step 2) are further cultured in a medium containing a growth factor, cyclopamine, noggin, and the like to differentiate into posterior foregut cells. The culture period is 1 day to 5 days, preferably about 2 days. The culture may be performed by any of two-dimensional culture and three-dimensional culture.

The culture temperature is not particularly limited, and the culture is performed at 30 to 40° C. (for example, 37° C.). The concentration of carbon dioxide in a culture container is around, for example, 5%.

As in step 1), a basal medium for use in the culture of mammalian cells can be used as culture medium. The medium may be appropriately supplemented with a serum replacement, a vitamin, an antibiotic, and the like, in addition to the growth factor.

The growth factor is preferably EGF, KGF, and/or FGF10, more preferably EGF and/or KGF, further preferably KGF.

The concentration of the growth factor in the medium is appropriately set depending on the type of the growth factor used and is usually about 0.1 nM to 1000 μM, preferably about 0.1 nM to 100 μM. In the case of EGF, its concentration is about 5 to 2000 ng/ml (that is, about 0.8 to 320 nM), preferably about 5 to 1000 ng/ml (that is, about 0.8 to 160 nM), more preferably about 10 to 1000 ng/ml (that is, about 1.6 to 160 nM). In the case of FGF10, its concentration is about 5 to 2000 ng/ml (that is, about 0.3 to 116 nM), preferably about 10 to 1000 ng/ml (that is, about 0.6 to 58 nM). For example, in the case of using KGF as the growth factor, its concentration is usually 5 to 150 ng/mL, preferably 30 to 100 ng/mL, particularly preferably about 50 ng/mL.

The concentration of the cyclopamine in the medium is not particularly limited and is usually 0.5 to 1.5 μM, preferably 0.3 to 1.0 μM, particularly preferably about 0.5 μM.

The concentration of the noggin in the medium is not particularly limited and is usually 10 to 200 ng/mL, preferably 50 to 150 ng/mL, particularly preferably about 100 ng/mL.

Step 4) Differentiation into Pancreatic Progenitor Cells

The posterior foregut cells obtained in step 3) are further cultured in a medium containing a factor having CDK8/19-inhibiting activity, preferably a medium containing a factor having CDK8/19-inhibiting activity and a growth factor, to induce their differentiation into pancreatic progenitor cells. The culture period is 2 days to 10 days, preferably about 5 days. The culture may be performed by any of two-dimensional culture and three-dimensional culture.

In the case of two-dimensional culture, according to the previous report (Toyoda et al., Stem cell Research (2015) 14, 185-197), the posterior foregut cells obtained in step 3) are treated with 0.25% trypsin-EDTA and dispersed by pipetting and the obtained dispersion is subjected to centrifugal separation. Recovered cells are resuspended in a small amount of a fresh medium and the cell suspension is reseeded to a fresh medium of step 4).

As in step 1), a basal medium for use in the culture of mammalian cells can be used as culture medium. The medium may be appropriately supplemented with a serum replacement, a vitamin, an antibiotic, and the like, in addition to the growth factor.

Each of the compounds mentioned above or salts thereof can be used as the factor having CDK8/19-inhibiting activity. The amount of the factor added to the medium is appropriately determined according to the compound or the salt thereof used and is usually about 0.00001 μM to 5 μM, preferably 0.00001 μM to 1 μM. The concentration of the factor having CDK8/19-inhibiting activity in the medium is preferably a concentration that attains inhibitory activity of 50% or more for CDK8/19.

The growth factor is preferably EGF, KGF, and/or FGF10, more preferably KGF and/or EGF, further preferably KGF and EGF.

The concentration of the growth factor in the medium is appropriately set depending on the type of the growth factor used and is usually about 0.1 nM to 1000 µM, preferably about 0.1 nM to 100 µM. In the case of EGF, its concentration is about 5 to 2000 ng/ml (that is, about 0.8 to 320 nM), preferably about 5 to 1000 ng/ml (that is, about 0.8 to 160 nM), more preferably about 10 to 1000 ng/ml (that is, about 1.6 to 160 nM). In the case of FGF10, its concentration is about 5 to 2000 ng/ml (that is, about 0.3 to 116 nM), preferably about 10 to 1000 ng/ml (that is, about 0.6 to 58 nM). For example, in the case of using KGF and EGF as the growth factor, the concentration of EGF is usually 5 to 150 ng/mL, preferably 30 to 100 ng/mL, particularly preferably about 50 ng/mL, and the concentration of KGF is usually 10 to 200 ng/mL, preferably 50 to 150 ng/mL, particularly preferably about 100 ng/mL.

Culture on the first day in step 4) may be performed in the presence of a ROCK inhibitor, and culture on the following days may be performed in a medium containing no ROCK inhibitor.

The medium may also contain a protein kinase C (PKC) activator. PdBU (PKC activator II), TPB (PKC activator V), or the like is used as the PKC activator, though the PKC activator is not limited thereto. The concentration of the PKC activator to be added is about 0.1 to 100 ng/ml, preferably about 1 to 50 ng/ml, more preferably about 3 to 10 ng/ml.

The medium may also be supplemented with dimethyl sulfoxide and/or activin (1 to 50 ng/ml).

In any of the steps, the medium may be supplemented with a serum replacement (for example, B-27 supplement, ITS-G), in addition to the components described above. Also, an amino acid, L-glutamine, GlutaMAX (product name), a non-essential amino acid, a vitamin, nicotinamide, an antibiotic (for example, Antibiotic-Antimycotic (also referred to as AA herein), penicillin, streptomycin, or a mixture thereof), an antimicrobial agent (for example, amphotericin B), an antioxidant, pyruvic acid, a buffer, inorganic salts, and the like may be added thereto, if necessary. In the case of adding an antibiotic to the medium, its concentration in the medium is usually 0.01 to 20% by weight, preferably 0.1 to 10% by weight. The culture may be performed by any of two-dimensional culture and three-dimensional culture.

In the case of two-dimensional culture, the cell culture is performed by adherent culture without the use of feeder cells. For the culture, a culture container, for example, a dish, a flask, a microplate, or a cell culture sheet such as OptiCell (product name) (Nunc), is used. The culture container is preferably surface-treated in order to improve adhesiveness to cells (hydrophilicity), or coated with a substrate for cell adhesion such as collagen, gelatin, poly-L-lysine, poly-D-lysine, laminin, fibronectin, Matrigel (for example, BD Matrigel (Nippon Becton Dickinson Company, Ltd.)), or vitronectin. The culture container is preferably a culture container coated with type I-collagen, Matrigel, fibronectin, vitronectin or poly-D-lysine, more preferably a culture container coated with Matrigel or poly-D-lysine.

The culture temperature is not particularly limited, and the culture is performed at 30 to 40° C. (for example, 37° C.). The concentration of carbon dioxide in a culture container is around, for example, 5%.

The pancreatic progenitor cells obtained in step 4) can be further purified using a known surface marker glycoprotein 2 (GP2) or the like. The purification can be performed by a method known per se, for example, using anti-GP2 antibody-immobilized beads.

Step 5) Differentiation into Endocrine Progenitor Cells

The pancreatic progenitor cells obtained in step 4) are further cultured in a medium containing a growth factor to differentiate into endocrine progenitor cells. The culture may be performed by any of two-dimensional culture and three-dimensional culture. In the case of two-dimensional culture, the pancreatic progenitor cells obtained in step 4) are treated with 0.25% trypsin-EDTA and dispersed by pipetting and the dispersion is subjected to centrifugal separation. The cells are treated with 0.25% trypsin-EDTA and dispersed by pipetting and the obtained dispersion is subjected to centrifugal separation. Recovered cells are resuspended in a small amount of a fresh medium and the cell suspension is reseeded to a fresh medium of step 5). The culture period is 2 days to 3 days, preferably about 2 days.

As in step 1), a basal medium for use in the culture of mammalian cells can be used as culture medium. The medium is supplemented with SANT1, retinoic acid, ALK5 inhibitor II, T3, and LDN according to the previous report (Nature Biotechnology 2014; 32: 1121-1133) and may be appropriately further supplemented with a Wnt inhibitor, a ROCK inhibitor, FGF (preferably FGF2), a serum replacement, a vitamin, an antibiotic, and the like.

The culture is performed by nonadherent culture without the use of feeder cells. For the culture, a dish, a flask, a microplate, a porous plate (Nunc), or the like, or a bioreactor is used. The culture container is preferably surface-treated in order to decrease adhesiveness to cells.

The culture temperature is not particularly limited, and the culture is performed at 30 to 40° C. (for example, 37° C.). The concentration of carbon dioxide in a culture container is around, for example, 5%.

Step 6) Differentiation into Insulin-Producing Cells

The endocrine progenitor cells obtained in step 5) are further cultured in a medium containing a growth factor to differentiate into insulin-producing cells. The culture period is 10 days to 30 days, preferably about 10 to 20 days.

As in step 1), a basal medium for use in the culture of mammalian cells can be used as culture medium. The medium is supplemented with ALK5 inhibitor II, T3, LDN, γ-secretase inhibitor XX, γ-secretase inhibitor RO, N-cysteine, an AXL inhibitor, and ascorbic acid according to the previous report (Nature Biotechnology 2014; 32: 1121-1133) and may be appropriately further supplemented with a Wnt inhibitor, a ROCK inhibitor, FGF (preferably FGF2), a serum replacement, a vitamin, an antibiotic, and the like. For example, the medium may be supplemented with ALK5 inhibitor II, T3, LDN, γ-secretase inhibitor RO, and ascorbic acid or may be supplemented with T3, ALK5 inhibitor II, $ZnSO_4$, heparin, N-acetylcysteine, Trolox, and R428.

The culture may be performed by any of two-dimensional culture and three-dimensional culture. The culture does not employ feeder cells. Three-dimensional culture is performed by nonadherent culture. For the culture, a dish, a flask, a microplate, a porous plate (Nunc), or the like, or a bioreactor is used. The culture container is preferably surface-treated in order to decrease adhesiveness to cells.

The culture temperature is not particularly limited, and the culture is performed at 30 to 40° C. (for example, 37° C.). The concentration of carbon dioxide in a culture container is around, for example, 5%.

Differentiation into Pancreatic β Cells

The cells obtained in the preceding step can be differentiated into pancreatic β cells. The step of differentiation into a pancreatic β cell population can be performed by transplanting an endocrine progenitor cell population or a cell population at a later stage of differentiation, preferably an insulin-producing cell population, into a living body of an animal.

"Animal" is preferably a mammal. Examples thereof include humans, nonhuman primates, pigs, cattle, horses, sheep, goats, llamas, dogs, cats, rabbits, mice, and guinea pigs. A human is preferred.

The transplantation is preferably performed to an in vivo region where the cell population can be fixed at a given position, and can be performed, for example, subcutaneously, intraperitoneally, to the peritoneal mesothelium, to the greater momentum, to a fat tissue, to a muscle tissue, or beneath the capsule of each organ such as the pancreas or the kidney, in the animal. The number of cells to be transplanted may vary depending on factors such as the stage of differentiation of the cells to be transplanted, the age and body weight of a recipient, the size of a transplantation site, and the severity of a disease and is not particularly limited. For example, the number of cells can be around $10 \times 10^4$ cells to $10 \times 10^{11}$ cells. The transplanted cell population is induced to differentiate in an in vivo environment and can thereby differentiate into the cell population of interest, preferably a pancreatic β cell population, which may then be recovered or may be indwelled in vivo as it is.

For the transplantation, the cell population may be embedded in a gel containing a biocompatible material and then transplanted. For example, the cell population embedded in the gel containing a biocompatible material may be enclosed in a device such as a capsule, a bag, or a chamber and transplanted into a living body.

In the present invention, "embedding" means that an endocrine progenitor cell population or a cell population at a later stage of differentiation is contained in a scattered manner in the gel containing a biocompatible material.

As used herein, "biocompatible material" means an arbitrary material that induces neither marked immune response nor harmful biological reaction (for example, toxic reaction and blood coagulation) when transplanted into a living body and indwelled for a short period or a long period. Also, "biocompatible material" is preferably a biodegradable material. Examples of such a material include polylactic acid (PLA), polycaprolactone (PCL), polyurethane (PU), polyethylene glycol (PEG), polyhydroxyethyl methacrylate, polyglycolic acid (PGA), poly(lactic-co-glycolic acid) (PLGA), poly(3-hydroxybutyrate-co-hydroxyvalerate) (PHBV), poly(ethylene-co-vinyl acetate) (PEVA), polyacrylamide, polyethylene oxide, polyethyleneamine, polyhydroxybutyric acid, poly(N-vinylpyrrolidone), polyvinyl alcohol, polypropylene fumarate, polyacrylic acid, poly-e-caprolactone, polymethacrylic acid, polyvinylidene difluoride (PVDF), pectic acid, hyaluronic acid, heparin sulfate, chondroitin sulfate, heparan sulfate proteoglycan, heparin, chitin, chitosan, xanthan, carboxymethylcellulose, carboxymethyl chitosan, alginate, alginic acid ester, collagen, cellulose, silk fibroin, keratin, gelatin, fibrin, pullulan, laminin, gellan, silicon, urethane, elastin and modified forms thereof, and combinations thereof. The surface of "biocompatible material" may be modified (for example, coated with a substrate for cell adhesion (collagen, gelatin, poly-L-lysine, poly-D-lysine, laminin, fibronectin, Matrigel, vitronectin, etc.)) so as to permit cell adhesion or may be engineered with a functional group (for example, an amino group, a carboxyl group, a hydroxy group, a methacrylic acid group, and an acrylic acid group) known to control cell proliferation, differentiation, or functions, if necessary. In a particular embodiment, alginate or alginic acid ester can be suitably used as "biocompatible material".

The alginate can be a water-soluble salt, and a metal salt, an ammonium salt, or the like can be used. For example, sodium alginate, calcium alginate, or ammonium alginate can be suitably used.

The alginic acid ester (also referred to as propylene glycol alginate) is a derivative in which propylene glycol is bonded to the carboxyl group of alginic acid through an ester bond.

The ratio of mannuronic acid to guluronic acid (M/G ratio) contained in the alginate is arbitrary. In general, in the case of M>G, a highly flexible gel can be formed. In the case of M<G, a strong gel can be formed. In the present invention, alginate containing guluronic acid at a proportion of 10 to 90%, 20 to 80%, 30 to 70%, or 40 to 60% can be used.

The gel can be prepared using alginate or alginic acid ester in accordance with a known approach (WO2010/032242 and WO2011/154941) and can be obtained by adding a cross-linking agent to a solution of alginate or alginic acid ester for gelation.

The alginate or the alginic acid ester can be contained in an amount of 0.05 to 10% by weight, preferably 0.1 to 5% by weight, more preferably 0.5 to 3% by weight, in a solvent. The solvent can be any solvent capable of dissolving the alginate or the alginic acid ester, and water, physiological saline, or the like can be used.

The cross-linking agent can be any cross-linking agent that can allow a solution of alginate or alginic acid ester to gelate, and is not particularly limited. A polyvalent metal cation can be used. The polyvalent metal cation is preferably a divalent metal cation, more preferably a calcium ion, a strontium ion, or a barium ion. The cross-linking agent can be used in the form of a salt. In the present invention, at least one member selected from calcium chloride, strontium chloride, and barium chloride can be used as the cross-linking agent.

The gel containing alginate or alginic acid ester can contain a nanofiber. The nanofiber is a natural or synthetic fiber having a diameter of a nanometer order. Examples of the natural nanofiber include nanofibers containing one or more of collagen, cellulose, silk fibroin, keratin, gelatin, and polysaccharides such as chitosan. Examples of the synthetic nanofiber include polylactic acid (PLA), polycaprolactone (PCL), polyurethane (PU), poly(lactide-co-glycolide) (PLGA), poly(3-hydroxybutyrate-co-hydroxyvalerate) (PHBV), and poly(ethylene-co-vinylacetate) (PEVA). The nanofiber can be contained in an amount of less than 1% by weight, for example, 0.9% by weight, 0.8% by weight, 0.7% by weight, 0.6% by weight, 0.5% by weight, or less than the amount, in the gel containing alginic acid. The lower limit of the amount of the nanofiber contained in the gel containing alginate or alginic acid ester is not particularly limited and can be 0.05% by weight or more, preferably 0.1% by weight or more.

The embedding of the cell population in the gel containing alginate or alginic acid ester can be performed by an arbitrary approach and can be performed, for example, by mixing the cell population into a solution of alginate or alginic acid ester and gelating it, though the embedding is not particularly limited thereto.

The cell population can be contained in an amount selected from $1 \times 10^4$ cells to $1 \times 10^9$ cells/mL, preferably $1 \times 10^7$ cells to $1 \times 10^8$ cells/mL, in the solution of alginate or alginic acid ester.

The gelation of the solution of alginate or alginic acid ester containing the cell population can be performed by adding a cross-linking agent to the solution. The amount of the cross-linking agent added can be an amount selected from 0.1 to 5% by weight, for example, 0.1 to 1% by weight, with respect to the solution. The gelation can be performed in a container having a predetermined configuration and/or shape for use in cell culture or cell transplantation, or in a mold designed so as to obtain a gel adapted to the container.

Alternatively, the gelation may be performed by forming a gel capsule containing alginic acid in accordance with a known approach (WO2010/010902). Specifically, the solution of alginate or alginic acid ester containing the cell population may be added dropwise to a solution of a cross-linking agent for gelation. The size of liquid droplets can be adjusted according to the shape of a nozzle for dropwise addition or a dropwise addition method, and by extension, the size of the gel capsule containing alginic acid can be defined. The dropwise addition method is not particularly limited and can be performed by an approach such as an air spray method, an airless spray method, or a static spray method. The size of the gel capsule containing alginic acid is not particularly limited and can be a diameter of 5 mm or smaller, 1 mm or smaller, or 500 μm or smaller. The cross-linking agent solution can contain the cross-linking agent in an amount selected from 0.1 to 10% by weight, for example, 0.1 to 5% by weight.

In the present invention, "PLK inhibitor" is a substance having inhibitory activity for polo-like kinase (PLK). PLK, the serine-threonine kinase family conserved in eukaryotes, is a kinase responsible for the progression of the M phase of cell cycles and is known to include four kinases PLK1, PLK2, PLK3, and PLK4. The PLK inhibitor used in the present invention can inhibit the proliferation of CHGA-negative cells and may be an inhibitor for any of PLK1, PLK2, PLK3, and PLK4, and an inhibitor for each PLK may be an inhibitor for other PLKs. The PLK inhibitor used in the present invention can inhibit the proliferation of CHGA-negative cells and may be a substance having the PLK-inhibiting activity as well as other activities (inhibitory activity, etc.). Preferably, in the present invention, "PLK inhibitor" is an inhibitor having inhibitory activity for PLK1, or PLK4, preferably an inhibitor having greater selectivity for PLK1 or PLK4. For example, a substance having a 50% inhibitory concentration ($IC_{50}$) of 1 μM or less, preferably 100 nM or less, more preferably 50 nM or less, further preferably 10 nM or less, particularly preferably 5 nM or less, especially preferably 3 nM or less, against PLK1 or PLK4 can be suitably used. A method for determining the PLK-inhibiting activity can be selected from known methods. Examples thereof include determination methods using Serine/Threonine Kinase Assay Kits (MEDICAL & BIOLOGICAL LABORATORIES CO., LTD.). In the present invention, a conventionally known "PLK inhibitor" may be used and can be found in patent literatures or non patent literatures.

Examples of the PLK inhibitor that may be used in the present invention include, but are not limited to, (R)-5-(6-((4-methylpiperazin-1-yl)methyl)-1H-benz[d]imidazol-1-yl)-3-(1-(2-(trifluoromethyl)phenyl)ethoxy)thiophene-2-carboxamide (CAS No. 929095-18-1) (the compound may be herein also referred to as "CAS929095-18-1"), (1S,2R)-2-[3-[(1E)-2-[4-[[(2R,6S)-2,6-dimethyl-4-morpholinyl] methyl]phenyl]ethenyl]-1H-indazol-6-yl]-5'-methoxy-spiro [cyclopropane-1,3'-[$^3$H]indol]-2'(1'H)-one (CAS No. 1338800-06-8) (the compound may be herein also referred to as "CAS1338800-06-8"), 2-[[2-fluoro-4-[[(2-fluoro-3-nitrophenyl)methyl]sulfonyl]phenyl]thio]-5-methoxy-N-(5-methyl-1H-pyrazol-3-yl)-6-(4-morpholinyl)-4-pyrimidinamine (CAS No. 1798871-30-3), 2-[[2-fluoro-4-[[(2-fluoro-3-nitrophenyl)methyl]sulfonyl]phenyl]thio]-5-methoxy-N-(5-methyl-1H-pyrazol-3-yl)-6-(1-piperidinyl)-4-pyrimidinamine (CAS No. 1798871-31-4), 7-nitro-5-(trifluoromethyl)-2-benzothiazolecarboxamide-3-oxide (CAS No. 40533-25-3), 5-(5,6-dimethoxy-1H-benzimidazol-1-yl)-3-[[2-(trifluoromethyl)phenyl]methoxy]-2-thiophenecarboxamide (CAS No. 660868-91-7), 4-[(9-cyclopentyl-7,7-difluoro-6,7,8,9-tetrahydro-5-methyl-6-oxo-5H-pyrimido[4,5-b][1,4]diazepin-2-yl)amino]-2-fluoro-5-methoxy-N-(1-methyl-4-piperidinyl)benzamide hydrochloride (CAS No. 2108449-45-0), 3-(1,3-benzodioxol-5-yl)-N-[(1S)-1-phenylethyl]-isoxazolo[5,4-c]pyridin-5-amine (CAS No. 1082739-92-1), (1S,6bR,9aS,11R,11bR) 11-(acetyloxy)-1,6b,7,8,9a,10,11,11b-octahydro-1-(methoxymethyl)-9a,11b-dimethyl-3H-furo[4,3,2-de] indeno[4,5,-h]-2-h]-2-benzopyran-3,6,9-trione (CAS No. 19545-26-7), 5-cyano-7-nitro-2-benzothiazolecarboxamide-3-oxide (CAS No. 40647-02-7), 2,3,4,5-tetrahydro-7-hydroxy-1H-benzofuro[2,3-c]azepin-1-one (CAS No. 521937-07-5), 1-[6-[(3-acetyl-2,4,6-trihydroxy-5-methylphenyl) methyl]-5,7-dihydroxy-2,2-dimethyl-2H-1-benzopyran-8-yl]-3-phenyl-2-propen-1-one (CAS No. 82-08-6), N-[[4-[(6-chloro-3-pyridinyl)methoxy]-3-methoxyphenyl]methyl]-3, 4-dimethoxy-benzeneethanamine hydrochloride CAS No. 1052532-15-6), A66 (CAS No. 1166227-08-2), (R)-2-(1-(7-methyl-2-morpholino-4-oxo-4H-pyrido[1,2-a]pyrimidin-9-yl)ethylamino)benzoic acid (CAS No. 1173900-33-8), N-[(4-methoxyphenyl)sulfonyl]-N-[2-[(1E)-2-(1-oxido-4-pyridinyl)ethenyl]phenyl]-acetamide (CAS No. 173529-46-9), sodium (E)-2-((2-methoxy-5-(((2,4,6-trimethoxystyryl) sulfonyl)methyl)phenyl)amino)acetate (CAS No. 1225497-78-8), 4-((9-cyclopentyl-7,7-difluoro-5-methyl-6-oxo-6,7,8, 9-tetrahydro-5H-pyrimido[4,5-b][1,4]diazepin-2-yl)amino)-2-fluoro-5-methoxy-N-(1-methylpiperidin-4-yl)benzamide (CAS No. 1137868-52-0), 4-((6-chloro-2-methoxyacridin-9-yl)methyl)-2-((4-(2-(dimethylamino)ethyl)piperazin-1-yl) methyl)phenol (CAS No. 2247919-28-2), 2-methyl-5-(1-methylethyl)-1-[0-(2-methylbenzoyl)oxime]-2,5-cyclohexadiene-1,4-dione (CAS No. 321688-88-4), 9-cyclopentyl-2-[[2-ethoxy-4-(4-hydroxy-1-piperidinyl) phenyl]amino]-5,7,8,9-tetrahydro-5-methyl-6H-pyrimido[4, 5-b][1,4]diazepin-6-one (CAS No. 1228817-38-6), 2,5-cyclohexadiene-1,4-dione,2-methyl-5-(1-methylethyl)-,1-oxime (CAS No. 17302-61-3) and salts thereof. These compounds may have one or more substituents or their substructures (substituents, rings, etc.) may be partially converted as long as the compounds have PLK-inhibiting activity, preferably a 50% inhibitory concentration ($IC_{50}$) of 1 μM or less, preferably 100 nM or less, more preferably 50 nM or less, further preferably 10 nM or less, particularly preferably 5 nM or less, especially preferably 3 nM or less, against PLK1 or PLK4.

Preferably, in the present invention, the PLK inhibitor is (R)-5-(6-((4-methylpiperazin-1-yl)methyl)-1H-benz[d]imidazol-1-yl)-3-(1-(2-(trifluoromethyl)phenyl)ethoxy)thiophene-2-carboxamide (CAS No.: 929095-18-1) available as a PLK1 inhibitor, or (1S,2R)-2-[3-[(1E)-2-[4-[[(2R,6S)-2,6-dimethyl-4-morpholinyl]methyl]phenyl]ethenyl]-1H-indazol-6-yl]-5'-methoxy-spiro[cyclopropane-1,3'-[$^3$H]indol]-2' (1'H)-one (CAS No. 1338800-06-8) available as a PLK4 inhibitor.

The PLK inhibitor is not limited to the compounds described above, and an antisense oligonucleotide or siRNA against PLK mRNA, an antibody binding to PLK, a dominant negative PLK mutant, or the like can also be used as the PLK inhibitor. Such a PLK inhibitor is commercially available or can be synthesized according to a known method.

Each compound mentioned above or a salt thereof can be used as the PLK inhibitor. The amount of the PLK inhibitor added to the medium is appropriately determined according to the compound or the salt thereof used and is usually about 0.00001 μM to 100 μM, preferably 0.01 μM to M, more preferably 0.1 μM to 5 μM, particularly preferably 0.1 μM to 3 μM.

The pancreatic progenitor cell population, preferably the endocrine progenitor cell population, more preferably the insulin-producing cell population, or the cell population at a later stage of differentiation, obtained by the differentiation from pluripotent stem cells can be treated with the PLK inhibitor by the contact of the cell population with the PLK inhibitor. For example, the treatment can be performed by culturing the cell population in a medium supplemented with the PLK inhibitor. The PLK inhibitor can be contained in any amount capable of inhibiting PLK activity in the medium, and can be contained in an amount of, for example, 10 μM or less or 5 μM or less, preferably in an amount of 4 μM or less, more preferably 3 μM or less, for example, 2 μM or less or 1 μM or less. The lower limit of the amount of the PLK inhibitor added is not particularly limited and can be 0.1 μM or more, preferably 0.5 μM or more. The amount of the PLK inhibitor added is 10 μM or less and 0.1 μM or more, preferably 5 μM or less and 0.5 μM or more, particularly preferably 3 μM or less and 0.5 μM or more. The culture in the presence of the PLK inhibitor can be performed for at least 12 hours, preferably 24 hours or longer, 2 days or longer, 4 days or longer, 8 days or longer, 10 days or longer, or 15 days or longer. The culture in the presence of the PLK inhibitor is preferably performed for 4 days or longer. The medium may be replaced during the period of treatment with the PLK inhibitor and can be replaced with a medium supplemented with the PLK inhibitor, having the same or different composition as or from that before the replacement, according to the culture schedule.

The pancreatic progenitor cell population, preferably the endocrine progenitor cell population, more preferably the insulin-producing cell population, or the cell population at a later stage of differentiation, obtained by the differentiation from pluripotent stem cells can be subjected to the step of further differentiation into the cell population of interest, in addition to being treated with the PLK inhibitor. As used herein, "in addition to being treated with the PLK inhibitor" includes the case of performing the step of treatment with the PLK inhibitor and the step of differentiation at the same time, the case of treating the cell population with the PLK inhibitor, followed by the step of differentiation, and the case of subjecting the cell population to the step of differentiation, followed by the step of treatment with the PLK inhibitor. Thus, the medium for use in the treatment with the PLK inhibitor and the medium for use in the differentiation of the cell population may be separate media, or the medium for use in the step of differentiation may be further supplemented with the PLK inhibitor.

This approach can decrease or suppress the number of remaining proliferative cells contained in the pancreatic lineage, not inhibiting the proliferation of teratoma.

This approach can decrease or suppress the number of remaining proliferative cells contained in the pancreatic lineage, not inhibiting the proliferation of iPS cells (for example, not having to decrease the number of alkaline phosphatase-positive cells).

This approach is capable of reducing the absolute number of CHGA-negative cells, particularly, CHGA-negative and Ki67-positive cells, in an endocrine progenitor cell population or a cell population at a later stage of differentiation by treatment using a PLK inhibitor. This can deplete CHGA-negative cells, particularly, CHGA-negative and Ki67-positive cells, in the obtained cell population.

Specifically, the proportion of CHGA-negative cells, particularly, CHGA-negative and Ki67-positive cells, in the obtained cell population can be reduced as compared with the case of culture and/or differentiation without treatment with the PLK inhibitor. The proportion of the CHGA-negative cells in the obtained cell population is 40% or less, 30% or less, 20% or less, 15% or less, or 10% or less, preferably 20% or less, 15% or less, or 10% or less, for example, 9% or less, 8% or less, 7% or less, 6% or less, 5% or less, 4% or less, 3% or less, 2% or less, or 1% or less. The lower limit of the proportion is not particularly limited and is, for example, 0% or more, 0.1% or more, or 0.5% or more. The proportion can be expressed using two numeric values respectively selected from the numeric values of the upper limit and the lower limit. The proportion is, for example, 0.1% to 40%, 0.1% to 30%, 0.1% to 20%, 0.1% to 15%, or 0.1% to 10%, preferably 0.1% to 20%, 0.1% to 15%, or 0.1% to 10%. Alternatively, the proportion is 0.5% to 40%, 0.5% to 30%, 0.5% to 20%, 0.5% to 15%, or 0.5% to 10%, preferably 0.5% to 20%, 0.5% to 15%, or 0.5% to 10%. Particularly, the proportion of the CHGA-negative and Ki67-positive cells in the obtained cell population is 8% or less, 7% or less, 6% or less, 5% or less, 4% or less, 3% or less, 2% or less, 1% or less, or 0.5% or less, preferably 3% or less, 2% or less, 1% or less, or 0.5% or less. The lower limit of the proportion is not particularly limited and is, for example, 0% or more or 0.1% or more. The proportion can be expressed using two numeric values respectively selected from the numeric values of the upper limit and the lower limit. The proportion is, for example, 0.1% to 8%, 0.1% to 7%, 0.1% to 6%, 0.1% to 5%, 0.1% to 4%, 0.1% to 3%, 0.1% to 2%, 0.1% to 1%, or 0.1% to 0.5%, preferably 0.1% to 3%, 0.1% to 2%, 0.1% to 1%, or 0.1% to 0.5%.

According to this approach, the pancreatic progenitor cell population, preferably the endocrine progenitor cell population, more preferably the insulin-producing cell population, or the cell population at a later stage of differentiation, obtained by the differentiation from pluripotent stem cells, treated with the PLK inhibitor can be differentiated into insulin-producing cells or pancreatic β cells to obtain a cell population having inhibited growth of CHGA-negative cells, particularly, CHGA-negative and Ki67-positive cells, and including enriched insulin-producing cells or pancreatic β cells. Specifically, the proportion of insulin-producing cells or pancreatic β cells in the cell population obtained after induction of differentiation can be increased as compared with a cell population obtained without treatment with the PLK inhibitor. The proportion of the insulin-producing cells or the pancreatic β cells in the obtained cell population is 40% or more, 50% or more, 60% or more, 70% or more, 80% or more, or 90% or more. The upper limit of the proportion is not particularly limited and is 100% or less, 99% or less, 98% or less, 97% or less, 96% or less, or 95% or less. The proportion can be expressed using two numeric values respectively selected from the numeric values of the upper limit and the lower limit. The proportion is, for example, 40% to 95%, 50% to 95%, 60% to 95%, 70% to 95%, 80% to 95%, or 90% to 95%. Particularly, the proportion of the insulin-positive and NKX6.1-positive cells is 14% or more, preferably 15% or more, more preferably 20% or more, further preferably 25% or more, for example, 30% or more, 35% or more, 40% or more, or 45% or more. The upper limit of the proportion is not particularly limited and is 50% or less. The proportion can be expressed using two numeric values respectively selected from the numeric values of the upper limit and the lower limit. The proportion is, for example, 14% to 50%, preferably 15% to 50%, more preferably 20% to 50%, further preferably 25% to 50%.

The insulin-producing cells or the pancreatic β cells obtained by this approach may be indwelled as they are and used as insulin-secreting cells, when transplanted into a living body of an animal and differentiated in the living body of the animal. The insulin-producing cells or the pancreatic β cells obtained by this approach may circumvent the proliferation of CHGA-negative cells, particularly, CHGA-negative and Ki67-positive cells, and achieve safe and long-term graft survival of transplanted cells.

According to the present invention, the insulin-producing cell population or the pancreatic β cell population from which CHGA-negative cells, particularly, highly proliferative CHGA-negative and Ki67-positive cells, have been removed (cell population of the present invention) is transplanted as it is or in a capsule form to an affected area and is thereby useful as a cell medicine for treating diabetes mellitus, particularly, type I diabetes mellitus.

The cell population of the present invention may be a prodrug. As used herein, the prodrug refers to a cell population that is differentiated after transplantation into a living body and converted to cells having a function of treating a disease.

The cell population of the present invention has low toxicity (for example, acute toxicity, chronic toxicity, genetic toxicity, reproductive toxicity, cardiotoxicity, and carcinogenicity) and can be safely administered as it is or in the form of a pharmaceutical composition containing the cell population mixed with a pharmacologically acceptable carrier, etc. to a mammal (for example, a mouse, a rat, a hamster, a rabbit, a cat, a dog, cattle, sheep, a monkey, and a human).

Hereinafter, the present invention will be described with reference to Examples. However, the present invention is not limited by these Examples.

EXAMPLES

The differentiation of pluripotent stem cells into an endocrine progenitor cell population was carried out according to the above steps 1)-5), the previous report (Stem Cell Research (2015) 14, 185-197), etc. The differentiation into insulin-producing cells was carried out according to the above step 6), etc.

Example 1: Decrease in the Number of Unintended Cells (CHGA-Negative Cells) and Increase in the Number of Cells of Interest (Insulin-Positive and NKX6.1-Positive Cells) in Cell Population Obtained by Treating Insulin-Producing Cell Population with PLK Inhibitor—(1)

1. Method
  1) The endocrine progenitor cell population obtained by the differentiation from iPS cells was cultured for 7 days in a medium for differentiation (Improved MEM/1% B27/Penicillin Streptomycin medium) containing differentiation factors (ALK5 inhibitor II, T3, LDN, γ-secretase inhibitor RO, and ascorbic acid) and thereby differentiated into an insulin-producing cell population. Subsequently, a PLK1 inhibitor (CAS929095-18-1, 3 µM) or a PLK4 inhibitor (CAS1338800-06-8, 3 µM) was added to a medium for differentiation (Improved MEM/1% B27/Penicillin Streptomycin medium) containing differentiation factors (ALK5 inhibitor II, T3, LDN, γ-secretase inhibitor RO, and ascorbic acid), and the cells were cultured therein for 4 days.
  2) The endocrine progenitor cell population obtained by the differentiation from iPS cells was cultured for 11 days in a medium for differentiation (Improved MEM/1% B27/Penicillin Streptomycin medium) containing differentiation factors (ALK5 inhibitor II, T3, LDN, γ-secretase inhibitor RO, and ascorbic acid) and containing neither a PLK1 inhibitor (CAS929095-18-1) nor a PLK4 inhibitor (CAS1338800-06-8) and thereby differentiated into an insulin-producing cell population.

The number of CHGA-negative (and Ki67-positive or Ki67-negative) cells in the cell population obtained by each of the above methods 1) and 2) was counted by flow cytometry to determine the proportion of unintended cells, that is, a CHGA-negative (and Ki67-positive or Ki67-negative) rate, in each cell population.

The number of insulin-positive and NKX6.1-positive cells in the cell population obtained by each of the above methods 1) and 2) was counted by flow cytometry to determine the proportion of the cells of interest, that is, insulin-positive and NKX6.1-positive cells, in each method.

2. Results

An experiment using each method was performed twice. Table 1 shows results about the proportion of CHGA-negative (and Ki67-positive or Ki67-negative) cells and the proportion of insulin-positive and NKX6.1-positive cells obtained by treatment with a PLK1 inhibitor (CAS929095-18-1) or a PLK4 inhibitor (CAS1338800-06-8) in an insulin-producing cell production step.

In the case of treating cells using the PLK1 inhibitor (CAS929095-18-1) or the PLK4 inhibitor (CAS1338800-06-8) for last 4 days in the step of differentiation into insulin-producing cells, it was confirmed that the proportion of CHGA-negative cells was markedly decreased with good reproducibility for both Ki67-positive and Ki67-negative cells, as compared with a control. These results indicate that treatment with the PLK1 inhibitor (CAS929095-18-1) or the PLK4 inhibitor (CAS1338800-06-8) in the process of producing insulin-producing cells can decrease the number of unintended cells (CHGA-negative cells) in the cell population or inhibit the proliferation of these unintended cells.

On the other hand, it was confirmed that treatment with the PLK1 inhibitor (CAS929095-18-1) or the PLK4 inhibitor (CAS1338800-06-8) in the process of producing insulin-producing cells markedly increased the proportion of the cells of interest (insulin-positive and NKX6.1-positive cells) in the cell population with good reproducibility with decrease in the number of unintended cells, as compared with a control.

TABLE 1

| PLK inhibitor treatment | Absent | PLK1 inhibitor CAS929095-18-1 (3 µM) | PLK4 inhibitor CAS1338800-06-8 (3 µM) |
|---|---|---|---|
| Proportion of CHGA-negative and Ki67-positive cells | 9.0% 8.7% | 2.7% 1.5% | 0.8% 0.2% |
| Proportion of CHGA-negative and Ki67- | 32.1% | 16.9% | 11.4% |

TABLE 1-continued

| PLK inhibitor treatment | Absent | PLK1 inhibitor CAS929095-18-1 (3 μM) | PLK4 inhibitor CAS1338800-06-8 (3 μM) |
|---|---|---|---|
| negative cells | 35.6% | 14.6% | 12.4% |
| Proportion of insulin-positive | 13.4% | 16.8% | 22.4% |
| and NKX6.1-positive cells | 13.5% | 16.9% | 23.0% |
| 1. Method | 2) | 1) | 1) |

As for each proportion of cells, the upper results are from the first experiment, and the lower results are from the second experiment.

The results described above demonstrated that the treatment of a cell population at a final stage of differentiation in an insulin-producing cell production step with a PLK1 inhibitor or a PLK4 inhibitor is capable of decreasing the number of unintended cells (CHGA-negative cells) present in the cell population or inhibiting the proliferation of these unintended cells, and as a result, a cell population enriched in the cells of interest (insulin-positive and NKX6.1-positive cells) can be obtained.

Example 2: Decrease in the Number of Unintended Cells (CHGA-Negative Cells) and Increase in the Number of Cells of Interest (Insulin-Positive and NKX6.1-Positive Cells) in Cell Population Obtained by Treating Insulin-Producing Cell Population with PLK Inhibitor—(2)

1. Method

The endocrine progenitor cell population obtained by the differentiation from iPS cells was cultured in the same manner as the approach of Example 1 described above except that a 30 mL reactor for culture was used and the insulin-producing cell population was treated with the PLK inhibitor for 7 days. Specifically, the endocrine progenitor cell population obtained by the differentiation from iPS cells was cultured for 4 days in a medium for induction of differentiation in a 30 mL reactor for culture and thereby differentiated into an insulin-producing cell population. Subsequently, the cells were cultured for 7 days in a medium for differentiation supplemented with a PLK1 inhibitor (CAS929095-18-1, 3 μM) or a PLK4 inhibitor (CAS1338800-06-8, 3 μM).

For a control, the endocrine progenitor cell population obtained by the differentiation from iPS cells was cultured for 11 days in a medium for induction of differentiation in a 30 mL reactor for culture and thereby differentiated into an insulin-producing cell population.

2. Results

In a system using a 30 mL reactor for culture, it was also confirmed that treatment using a PLK1 inhibitor or a PLK4 inhibitor in the step of differentiation into insulin-producing cells markedly decreased the proportion of CHGA-negative cells with good reproducibility for both Ki67-positive and Ki67-negative cells, as compared with a control. Also, it was confirmed that the proportion of insulin-positive (and NKX6.1-positive) cells was markedly increased with good reproducibility with decrease in the number of unintended cells, as compared with a control. Although the treatment period using the PLK1 inhibitor or the PLK4 inhibitor was longer than that in Example 1 described above, the influence thereof was not found. It was thus confirmed that treatment with the PLK1 inhibitor or the PLK4 inhibitor can be performed at least for a cell population at a final stage of differentiation in an insulin-producing cell production step.

Example 3: Single-Cell RNA-Seq Expression Analysis of Insulin-Producing Cell Population As a result of carrying out single-cell RNA-seq expression analysis on the insulin-producing cell population obtained by the differentiation from pluripotent stem cells according to the previous report (Stem Cell Research (2015) 14, 185-197), the above step 1)-6), etc., it was found that the PLK gene was highly expressed in CHGA-negative cells which were unintended cells. Thus, an inhibitor targeting PLK was used for decreasing the number of unintended cells or the proliferation thereof. As a result, the marked effects as mentioned above were found.

The invention claimed is:

1. A method for producing an insulin-producing cell population comprising CHGA-negative cells at a proportion of 30% or less comprising the steps of:
   (a) providing an insulin-producing cell population, wherein the insulin producing cell population is produced from pluripotent stem cells,
   (b) contacting the population of (a) with a PLK inhibitor; and
   (c) obtaining an insulin-producing cell population comprising CHGA-negative cells at a proportion of 30% or less.

2. The production method according to claim 1, wherein the produced cell population comprises CHGA-negative cells at a proportion of 20% or less.

3. The production method according to claim 1, wherein the produced cell population comprises CHGA-negative and Ki67-positive cells at a proportion of 3% or less.

4. The production method according to claim 1, wherein the produced cell population comprises insulin-positive and NKX6.1-positive cells at a proportion of 15% or more.

5. The production method according to claim 1, further comprising maturing the insulin-producing cell population treated with the PLK inhibitor.

6. The production method according to claim 1, wherein the insulin-producing cell population is treated with 3 μM or less of the PLK inhibitor.

7. A composition comprising an insulin-producing cell population comprising CHGA-negative cells at a proportion of 20% or less; wherein the insulin-producing cell population is produced by the method of claim 1, wherein said composition comprises a PLK inhibitor.

8. The composition according to claim 7, wherein the composition comprises CHGA-negative and Ki67-positive cells at a proportion of 3% or less.

9. The composition according to claim 7, wherein the composition comprises insulin-positive and NKX6.1-positive cells at a proportion of 15% or more.

* * * * *